(12) United States Patent
Wang et al.

(10) Patent No.: US 11,625,607 B2
(45) Date of Patent: Apr. 11, 2023

(54) METHOD OF STRUCTURED NETWORK PRUNING AND SPARSITY SPEED-UP

(71) Applicant: Black Sesame Technologies Inc., San Jose, CA (US)

(72) Inventors: Zuoguan Wang, Los Gatos, CA (US); Yilin Song, San Jose, CA (US); Qun Gu, San Jose, CA (US)

(73) Assignee: BLACK SESAME TECHNOLOGIES INC., San Jose, CA (US)

( * ) Notice: Subject to any disclaimer, the term of this patent is extended or adjusted under 35 U.S.C. 154(b) by 44 days.

(21) Appl. No.: 16/287,625

(22) Filed: Feb. 27, 2019

(65) Prior Publication Data

US 2021/0097393 A1 Apr. 1, 2021

Related U.S. Application Data

(60) Provisional application No. 62/795,403, filed on Jan. 22, 2019.

(51) Int. Cl.
*G06F 1/03* (2006.01)
*G06N 3/082* (2023.01)

(52) U.S. Cl.
CPC .............. *G06N 3/082* (2013.01); *G06F 1/03* (2013.01)

(58) Field of Classification Search
CPC .................................. G06N 3/082; G06F 1/03
USPC .......................................................... 706/25
See application file for complete search history.

(56) References Cited

U.S. PATENT DOCUMENTS

2020/0265263 A1* 8/2020 Kluckner ......... G01N 35/00613

OTHER PUBLICATIONS

Razlighi et al., "LookNN: Neural Network with No Multiplication", Design, Automation & Test in Europe Conference (DATE) 2017 (Year: 2017).*

* cited by examiner

*Primary Examiner* — Tsu-Chang Lee
(74) *Attorney, Agent, or Firm* — Shun Yao; Yao Legal Services, Inc.

(57) ABSTRACT

A method of pruning a convolutional neural network, comprising at least one of determining a number of channels (N) between a network input and a network output, constructing N lookup tables, each lookup table matched to a respective channel and pruning filters in the convolutional neural network to create a shortcut between the network input and the network output based on the N lookup tables.

17 Claims, 12 Drawing Sheets

METHOD OF STRUCTURED NETWORK PRUNING AND SPARSITY SPEED-UP

BACKGROUND

Technical Field

The instant disclosure is related to convolutional neural networks and specifically improving computation efficiency and reducing memory storage of residual networks.

Background

Convolutional networks in training have excessively large memory size and computational power requirements. The size of the trained model may be large, which may present a concern for mobile clients where memory is at a premium. The computational power and memory size are related to accuracy, so potential solutions are sought to retain high accuracy in reduced computational and memory environments.

Previous convolutional neural networks (CNN) are discussed to provide a context for the instant disclosure. AlexNet comprises five convolutional layers and three fully connected (FC) layers. AlexNet uses an activation function called a rectified linear unit (ReLu) which returns a zero if it receives a negative input and returns any positive input value, the function is expressed as $f(x)=\max(0,\max)$. ReLu is a simple function comprised of two linear pieces which models non-linearity and interaction well, and it trains very quickly. The ReLu function is the most common activation function for CNNs. AlexNet solves overfitting by using a dropout layer after each fully connected layer. This dropout layer has a probability (P) that is applied to neurons and randomly switches off the activation of neurons with the probability (P).

VGG was architected by the Oxford VGG group. It replaced the large kernel sized filters of AlexNet with multiple 3×3 kernel sized filters in sequence. This multiple stacked filter assemblage increases the depth of the network and allows it to learn more complex features more quickly than one large filter. The VGG convolutional layers are followed by three fully connected layers. Even though VGG is accurate, it has very large computational and memory requirements. This large computational and memory requirement is driven by the fact that each output channel is connected to a respective input channel in dense connection.

GoogLeNet is built on the recognition that most activations are either zero, i.e. unnecessary, or redundant. This recognition allowed an architecture in which inputs and outputs are not connected one to one. This pruning to allows dense connections of VGG to become sparse connections. Unfortunately, sparse matrix multiplications were not optimized as dense multiplications were and made the system run slower. GoogLeNet then architected an inception module that approximated a sparse convolution neural network to a dense one and replaced the fully connected layers with global average pooling.

ResNet recognized that increasing the depth of the network should increase its accuracy, however, as the depth is increased the signal required to change the weights becomes small at early layers. This weight determination is performed at the end of the network by comparing the ground-truth and the prediction. This negligible learning at early layers is referred to as the vanishing gradient. Another issue with optimizing a large parameter space with additional layers leads to excessive training error rates. ResNet trains deep networks by constructing residual models.

As an example, if you have a first network that produces a first network training error and construct a second network added onto the first network so that the first network outputs are unaffected, then first network training error should be unaffected, however an effect is seen. To solve this first network training error issue, a direct path is created between the input and output to the module, to imply a mapping. The system then only needs to learn the features added to the first network input. Since the second network is learning only the residual, the module is denoted as a residual module. ResNet has an architecture similar to VGG in that it consists predominantly of 3×3 filters and implements global average pooling like GoogLeNet.

SUMMARY

A first example method of pruning a convolutional neural network, comprising at least one of determining a number of channels (N) between a network input and a network output, constructing N lookup tables, each lookup table matched to a respective channel and pruning filters in the convolutional neural network to create a shortcut between the network input and the network output based on the N lookup tables.

A second example method of pruning a convolutional neural network, comprising at least one of determining a number of channels (N) between a network input and a network output, constructing N lookup tables, each lookup table matched to a respective channel, merging the channels between the network input and the network output, categorizing the N channel data flows and pruning filters by categorized channel data flows.

A third example method of pruning a convolutional neural network, comprising at least one of determining a plurality of groupings of filter elements within a set of related filters, determining a weight of each of the plurality of groupings of filter elements, determining a mask based on the weights and pruning the plurality of groupings of filters based on the mask in each of the set of related filters.

A fourth example method of pruning a convolutional neural network, comprising at least one of determining a number of parallel process channels (PPC), determining a number of channels (N) between a network input and a network output and pruning the number of channels (N) to be an integer multiple of the number of parallel process channels (PPC).

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1A:
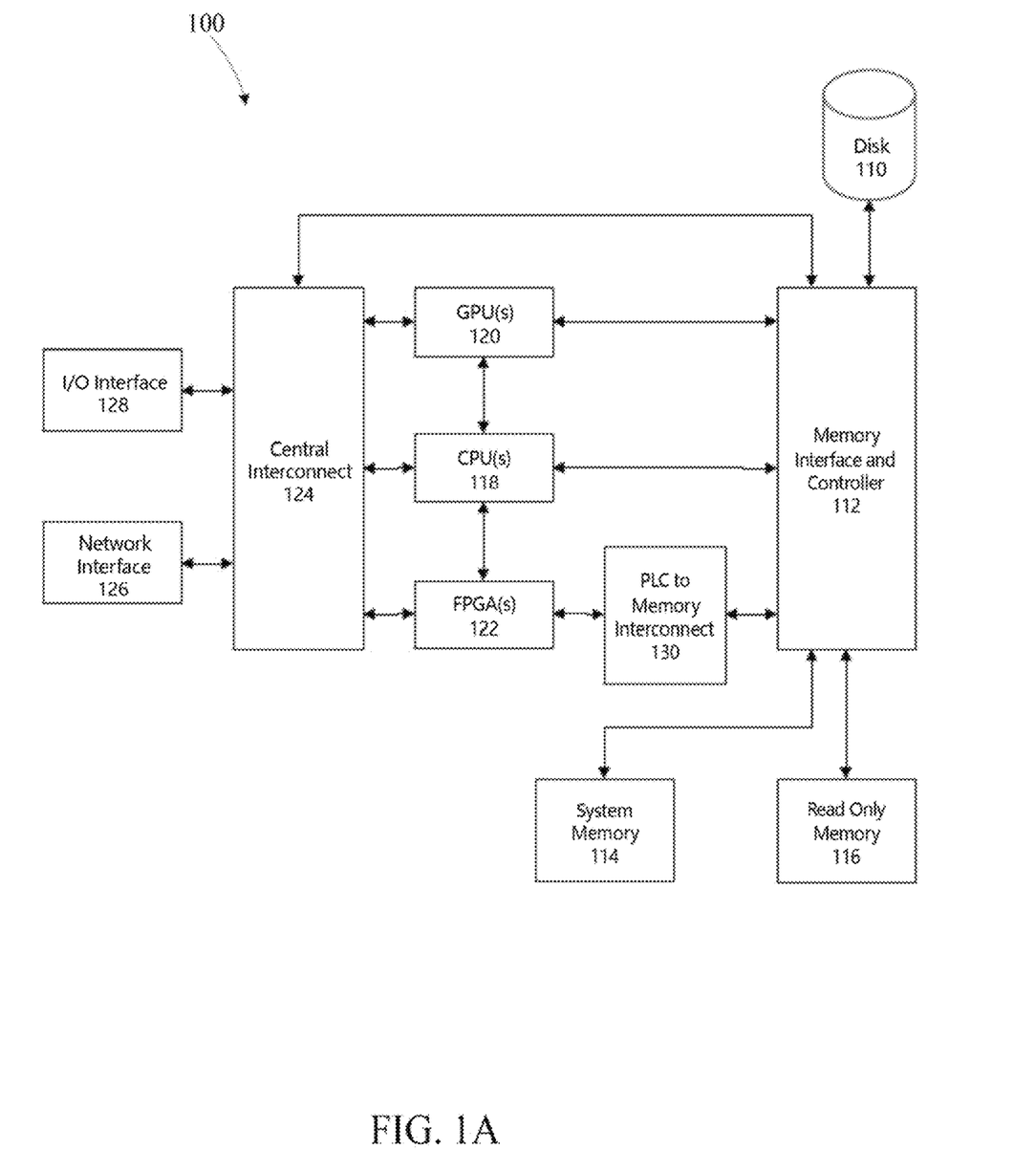
FIG. 1A is a first example system diagram in accordance with one embodiment of the disclosure.

FIG. 1A depicts an example hybrid computational system 100 that may be used to implement neural nets associated with the operation of one or more portions or steps of process 400, 600, 1000 or 1100, or components and processes provided by FIGS. 4, 6, 10 and 11. In this example, the processors associated with the hybrid system comprise a field programmable gate array (FPGA) 122, a graphical processor unit (GPU) 120 and a central processing unit (CPU) 18.

Each of the processing units 118, 120 and 122 has the capability of providing a neural net. A CPU is a general processor that may perform many different functions, its generality leads to the ability to perform multiple different tasks, however, its processing of multiple streams of data is limited and its function with respect to neural networks is very limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are specialized for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected to each other and are connected to a memory interface and controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

The system of FIG. 1A may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

Figure 1B:
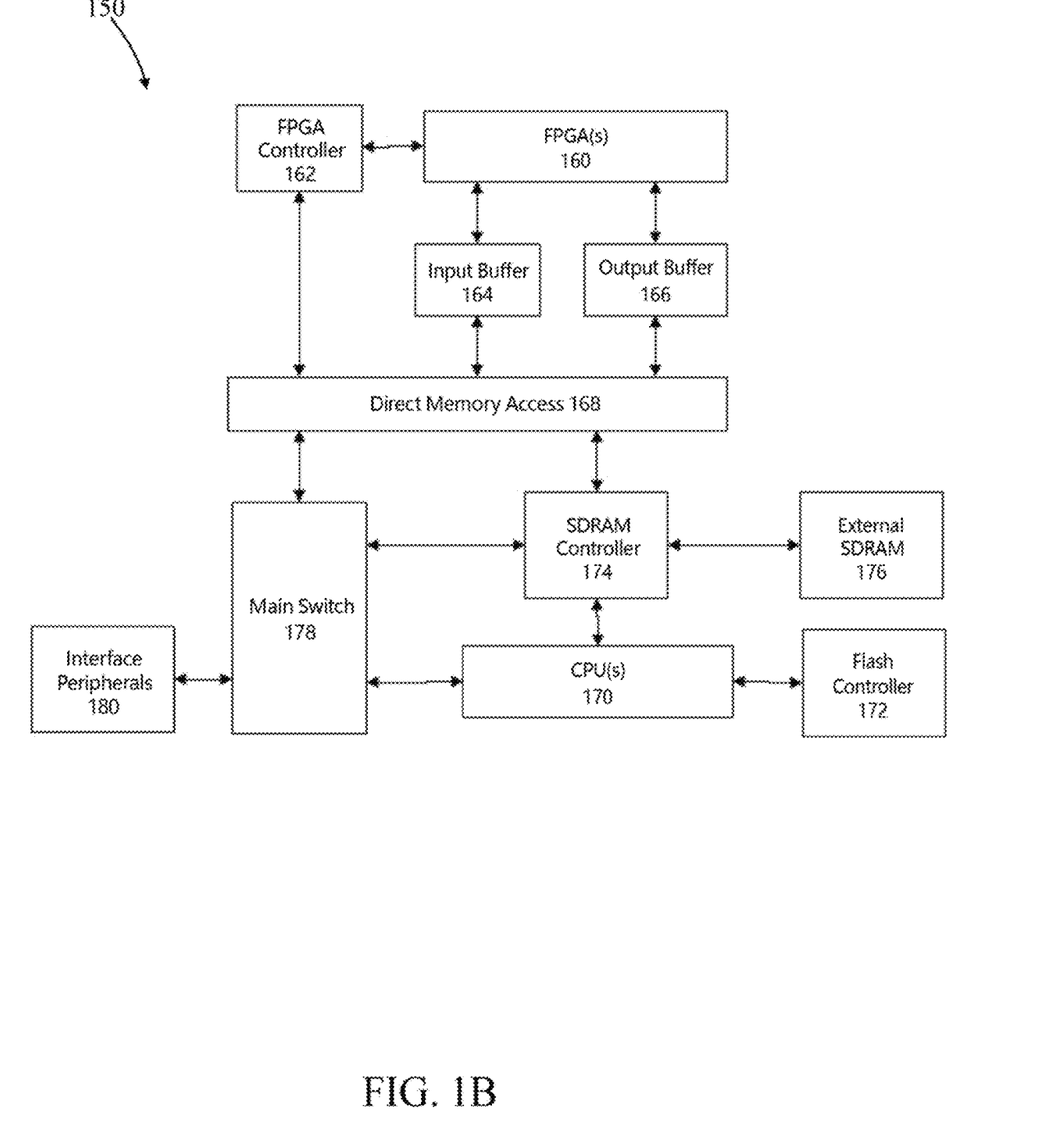
FIG. 1B is a second example system diagram in accordance with one embodiment of the disclosure.
Figure 4:
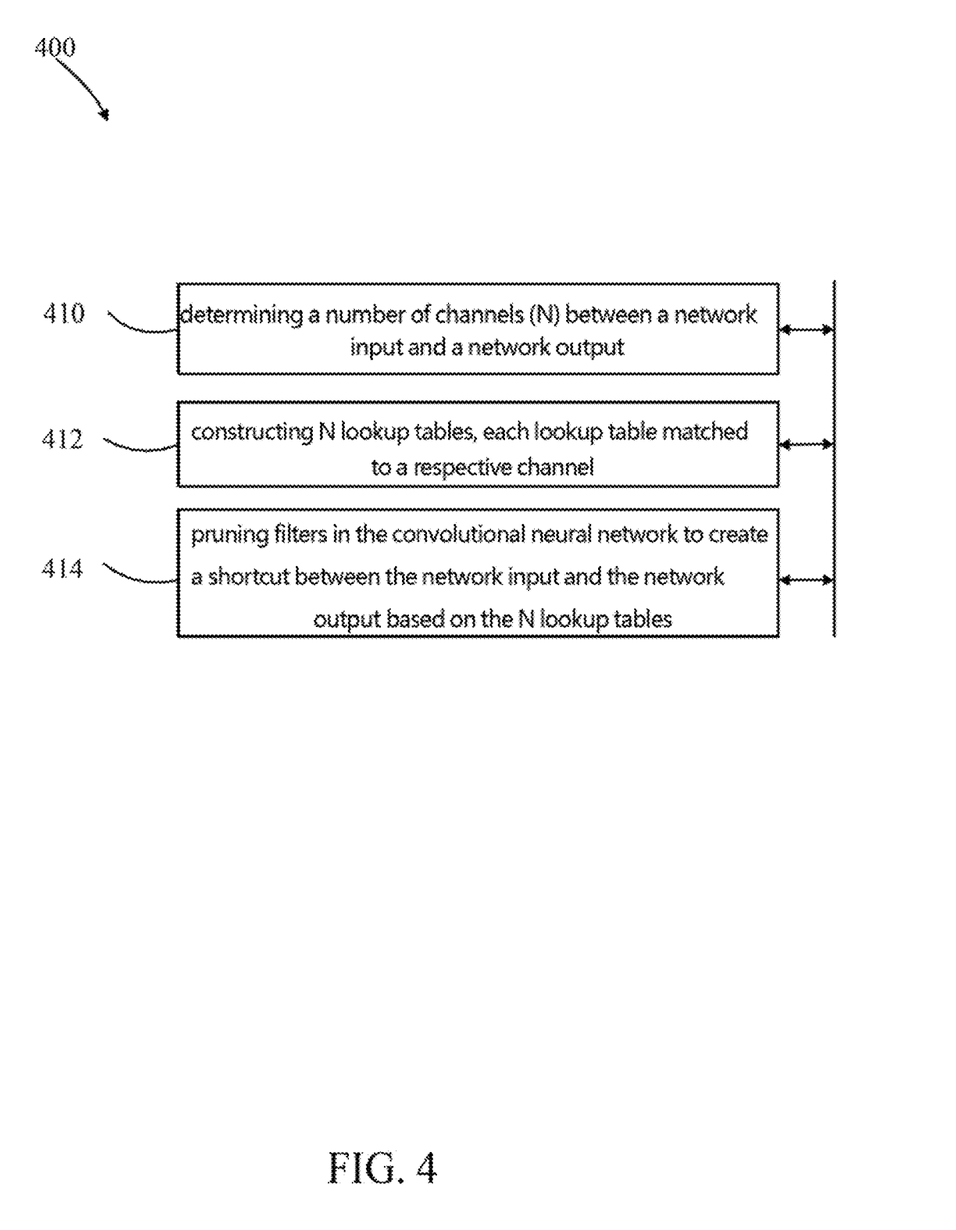
FIG. 4 is a depiction of a first method of pruning a convolutional neural network in accordance with one embodiment of the disclosure.

FIG. 1B depicts a second example hybrid computational system 150 that may be used to implement neural nets associated with the operation of one or more portions or steps of process 400, or components and processes provided by FIG. 4. In this example, the processors associated with the hybrid system comprise a field programmable gate array (FPGA) 160 and a central processing unit (CPU) 170.

The FPGA is electrically connected to an FPGA controller 162 which interfaces with a direct memory access (DMA) 168. The DMA is connected to input buffer 164 and output buffer 166, both of which are coupled to the FPGA to buffer data into and out of the FPGA respectively. The DMA consists of two first in first out (FIFO) buffers one for the host CPU and the other for the FPGA, the DMA allows data to be written to and read from the appropriate buffer.

On the CPU side of the DMA are a main switch 178 which shuttles data and commands to the DMA. The DMA is also connected to an SDRAM controller 174 which allows data to be shuttled to and from the FPGA to the CPU 170, the SDRAM controller is also connected to external SDRAM 176 and the CPU 170. The main switch 178 is connected to the peripherals interface 180. A flash controller 172 controls persistent memory and is connected to the CPU 170.

Computational neural networks (CNN) have been applied to several classification problems such as speech and image recognition. As a general rule the larger the network parameter count, the larger the system's ability to learn difficult functions. Larger networks however come at the cost of increased computational workloads. If a current parameters count is greater than a required optimum number, overfitting may occur. In the obverse, if an insufficient number of parameters are chosen, the network has a learning disability.

One approach for training a CNN is to learn a task with a large network and prune the tensor flow connections by removing redundant and duplicate connections. In large networks, network pruning is a technique that may solve some issues of the real-time application of computational neural networks such as heavy computation and high memory bandwidth. Potential issues resulting from current network pruning may include irregular network connections, which require additional representation and may result in inefficiencies in parallel computation.

Structured sparsity may provide advantages such as reduced computational resource in embedded computers, parallel computers and hardware based systems such as field programmable gate arrays (FPGAs).

In this document, the term channel and tensor flow connection will be synonymous.

Methods of Structured Network Pruning and Sparsity Seed-Up:

Network pruning may improve the computational efficiency with less storage. It is a technique to enable the deployment of solutions in resource limited scenarios such as with less powerful processors and limited memory as would be encountered in a mobile device.

Currently, methods that prune most popular ResNet-like convolutional neural network (CNN) structures are still not satisfactory due to the existence of shortcut structures and structure pruning methods that are designed to fit a hardware array partitions are absent. This work addresses these problems by proposing the following three methods.

The first method is to prune ResNet-like structures with a lookup-table based branch merging mechanism, the second method is to perform group-wise pruning that condenses storage and reduces computation cycles and the third method is to perform rounding of the pruned channel number to improve hardware utilization.

Figure 2:
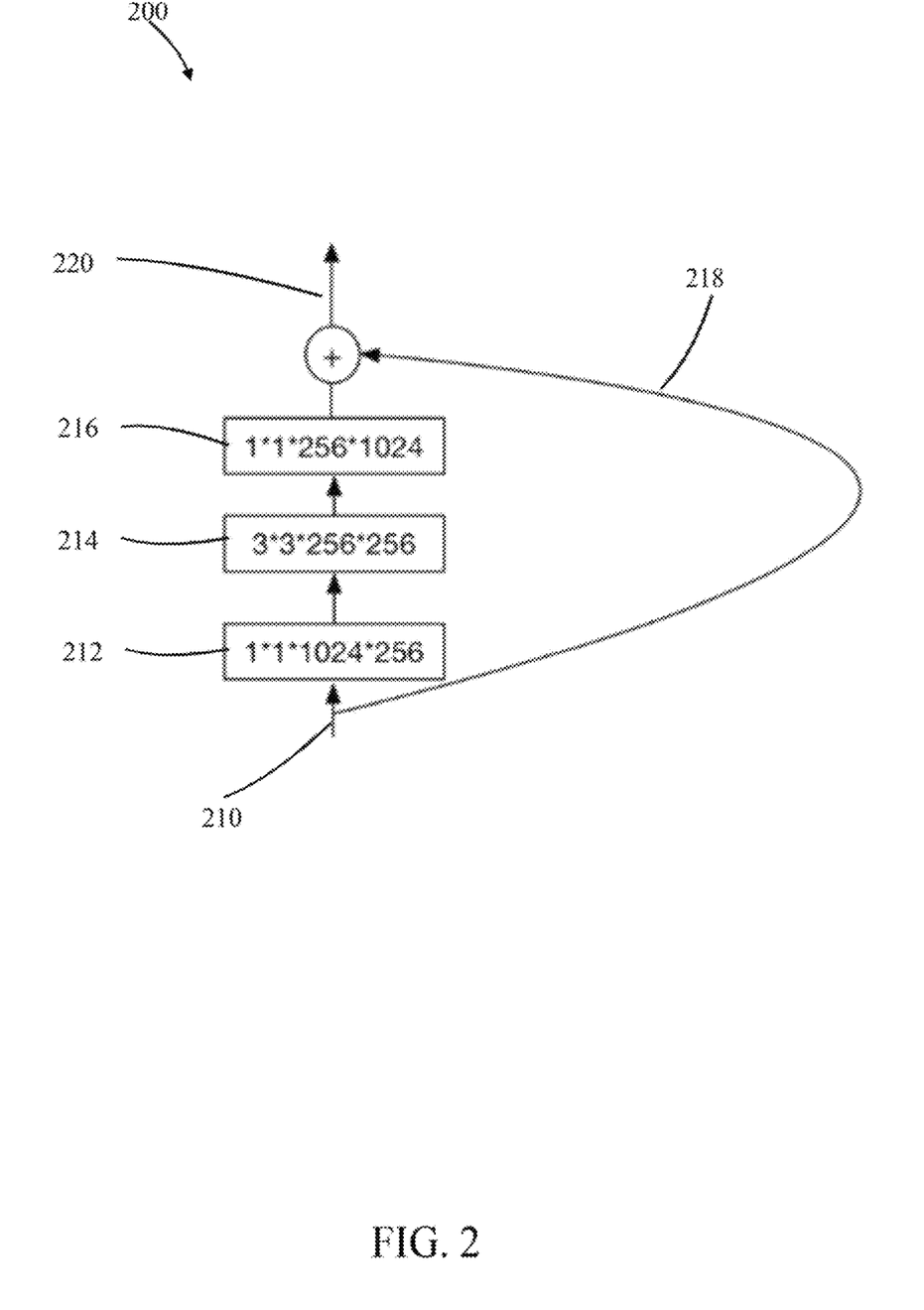
FIG. 2 is an example block of a convolutional neural network structure.

Pruning ResNet-Like Structures Utilizing a Lookup-Table Based Branch Merging Mechanism:

Pruning of straightforward structures, like VGG and Alexnet have been well studied. However, ResNet-like network introduce additional complexities due to the shortcut branch as shown in FIG. 2. Natively applying the typical channel pruning methods may cause channel mismatch of the inputs to add operation.

Figure 3:
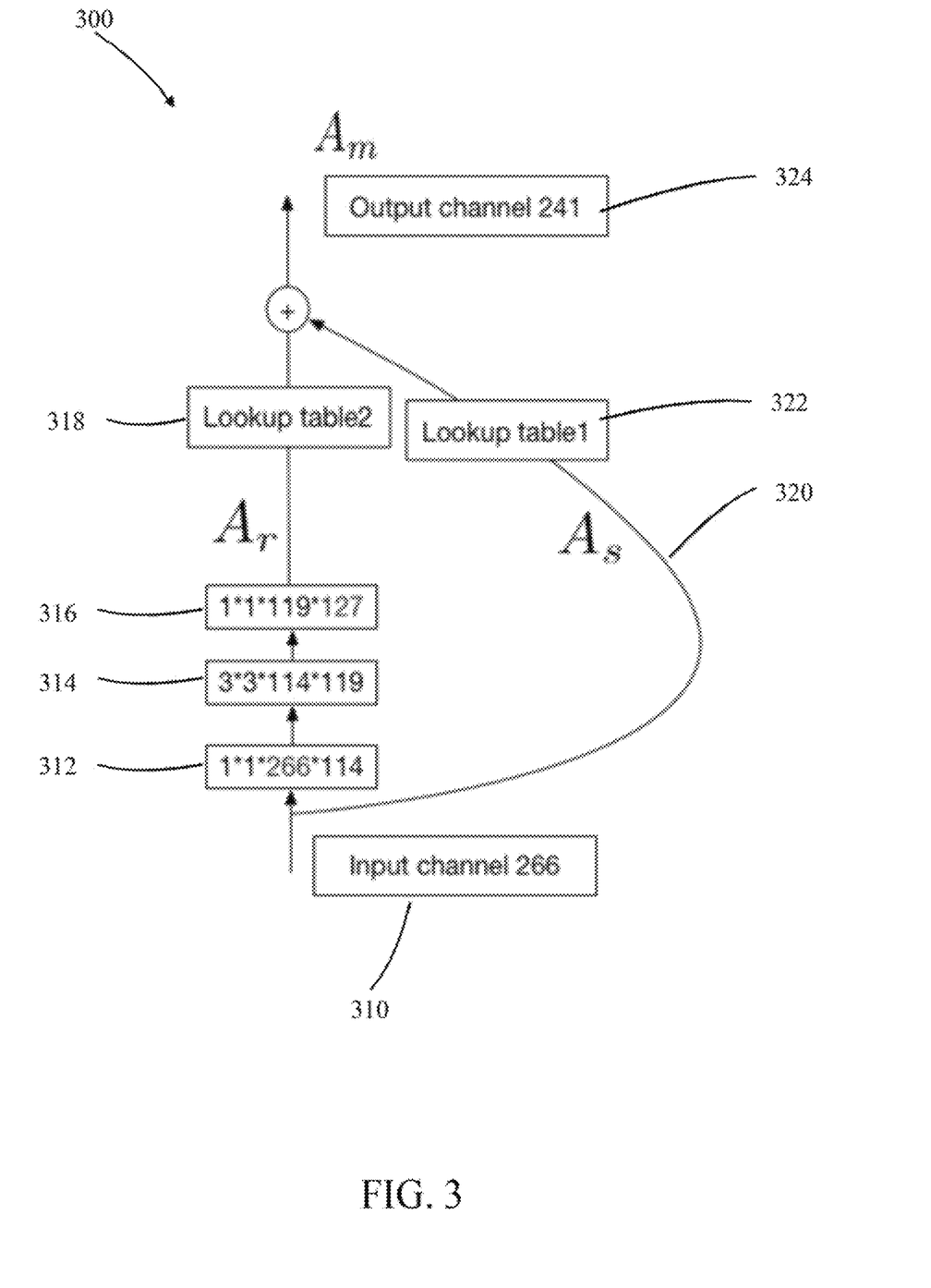
FIG. 3 is a an example convolutional neural network structure with lookup tables in accordance with one embodiment of the disclosure.

One possible solution to this issue may be found by introducing two lookup tables to the structure as shown in FIG. 3. The lookup tables enable the mapping between two branch channels. The lookup tables handle three types of mapping cases: i) channels that exist in both $A_r$ and $A_s$; ii) channels that exist only in $A_r$ and iii) channels that exist only in $A_s$. The introduction of lookup tables allows pruning this structure to allow input and output matching. Another method to solve this issue is to enforce pruning the same channels out of $A_r$ and $A_s$. However this solution may place additional constraints on the structure, risking inferior performance.

FIG. 4 depicts a first example method of pruning a convolutional neural network, comprising determining 410 a number of channels (N) between a network input and a network output, constructing 412 N lookup tables, each lookup table matched to a respective channel and pruning 414 filters in the convolutional neural network to create a shortcut between the network input and the network output based on the N lookup tables.

Figure 5:
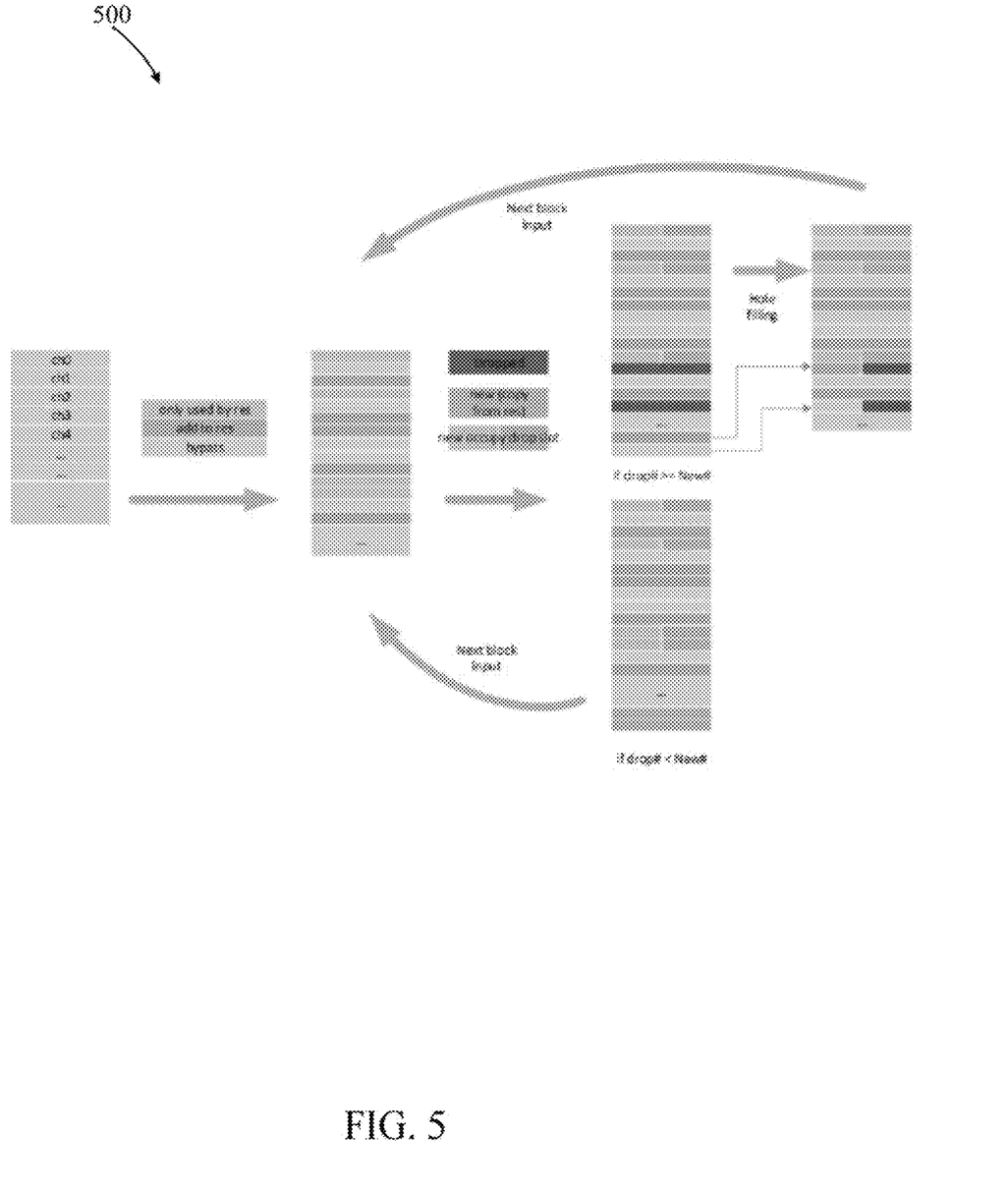
FIG. 5 is a an example convolutional neural network structure with pruned blocks in accordance with one embodiment of the disclosure.

FIG. 5 shows a corresponding hardware design for the merging of $A_r$ and $A_s$. The hardware replaces the two lookup tables with equivalent operations. Specifically, based on the lookup tables, the channels are separated into three categories, i.e., "only used by res", "add to res", and "bypass". Each category will be processed differently in the following steps. For example, the channel with the class "only used by res" will be dropped after $A_r$ is calculated. To save memory, the space of dropped channel may be filled with newly generated channels.

Figure 6:
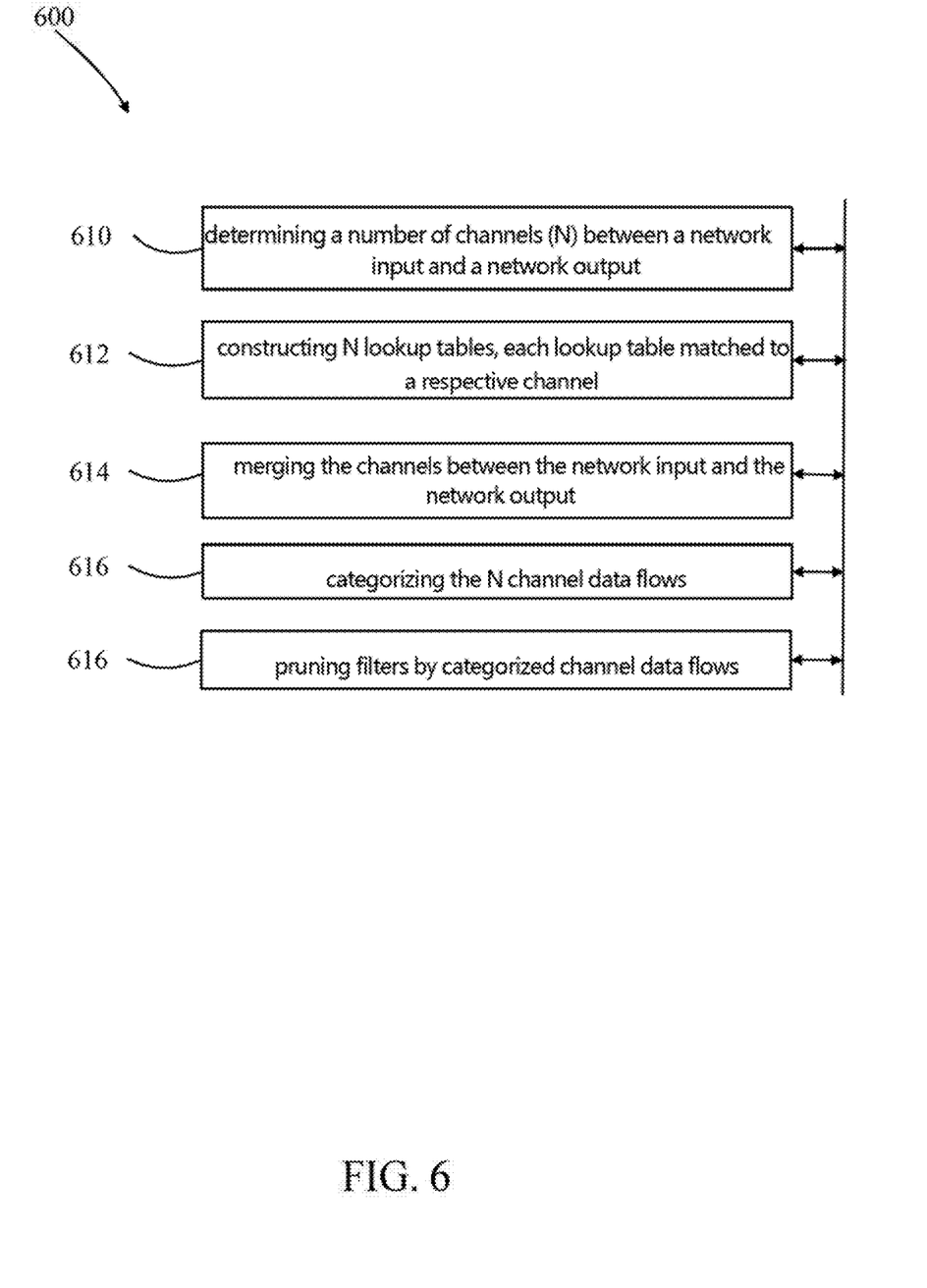
FIG. 6 is a depiction of a second method of pruning a convolutional neural network in accordance with one embodiment of the disclosure.

FIG. 6 depicts a second example method of pruning a convolutional neural network, comprising determining 610 a number of channels (N) between a network input and a network output, constructing 612 N lookup tables, each lookup table matched to a respective channel, merging 614 the channels between the network input and the network output, categorizing 616 the N channel data flows and pruning 618 filters by categorized channel data flows.

Figure 7:
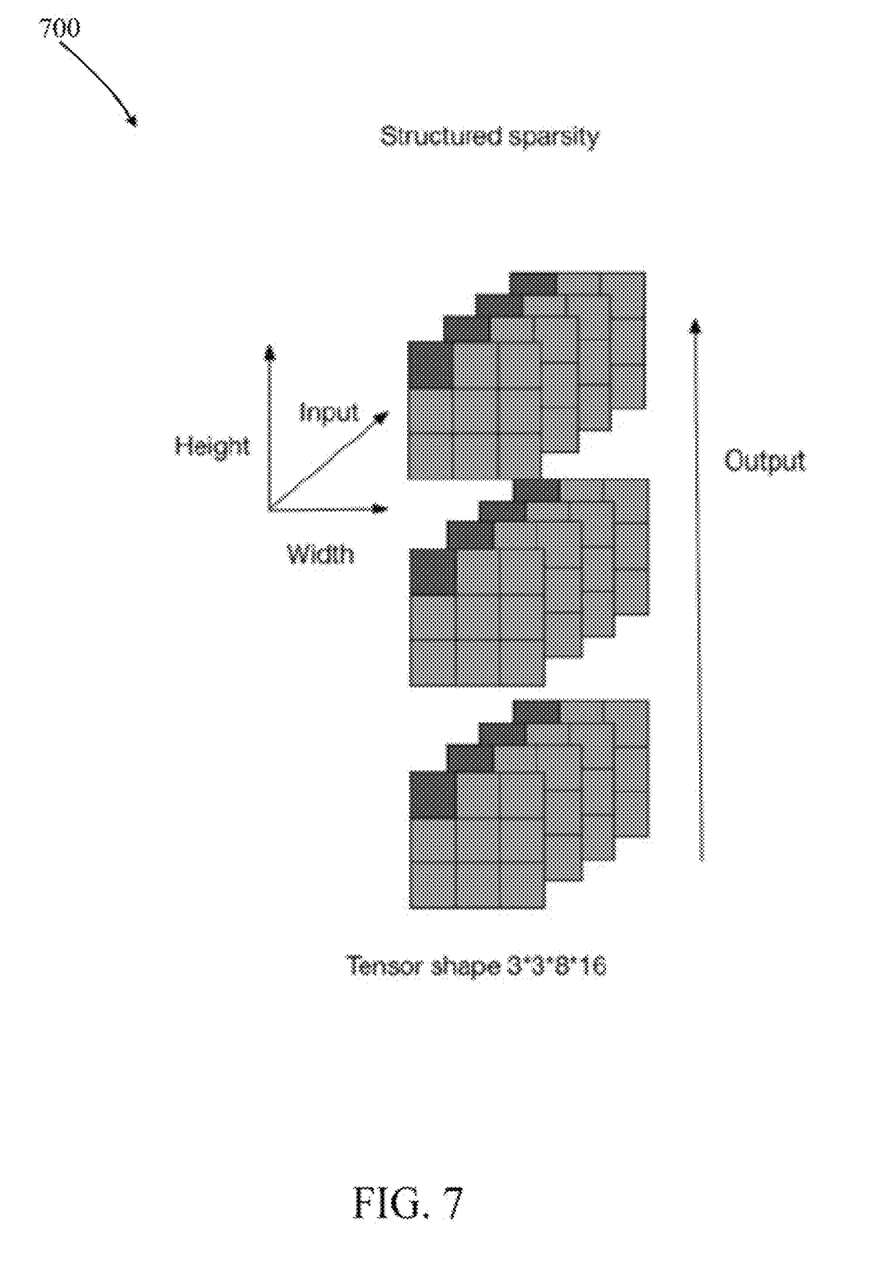
FIG. 7 is a depiction of a convolutional neural network having a group pruned tensor in accordance with one embodiment of the disclosure.

Group-Wise Pruning:

The methods in the previous section are channel-wise pruning, which remove 3D filters as the most basic element; this is a hardware friendly method. One possible issue is that it may not be able to aggressively remove filters without significantly reducing performance. Another possible solution is to remove elements within the filters. Currently, a popular way to do this is randomly removing filter elements based on weight amplitude. However, the results provide limited benefits in terms of storage and computation. One possible solution is to provide group pruning, which removes element blocks in the filter, rather than random elements. The methods are illustrated in FIG. 7.

Figure 8:
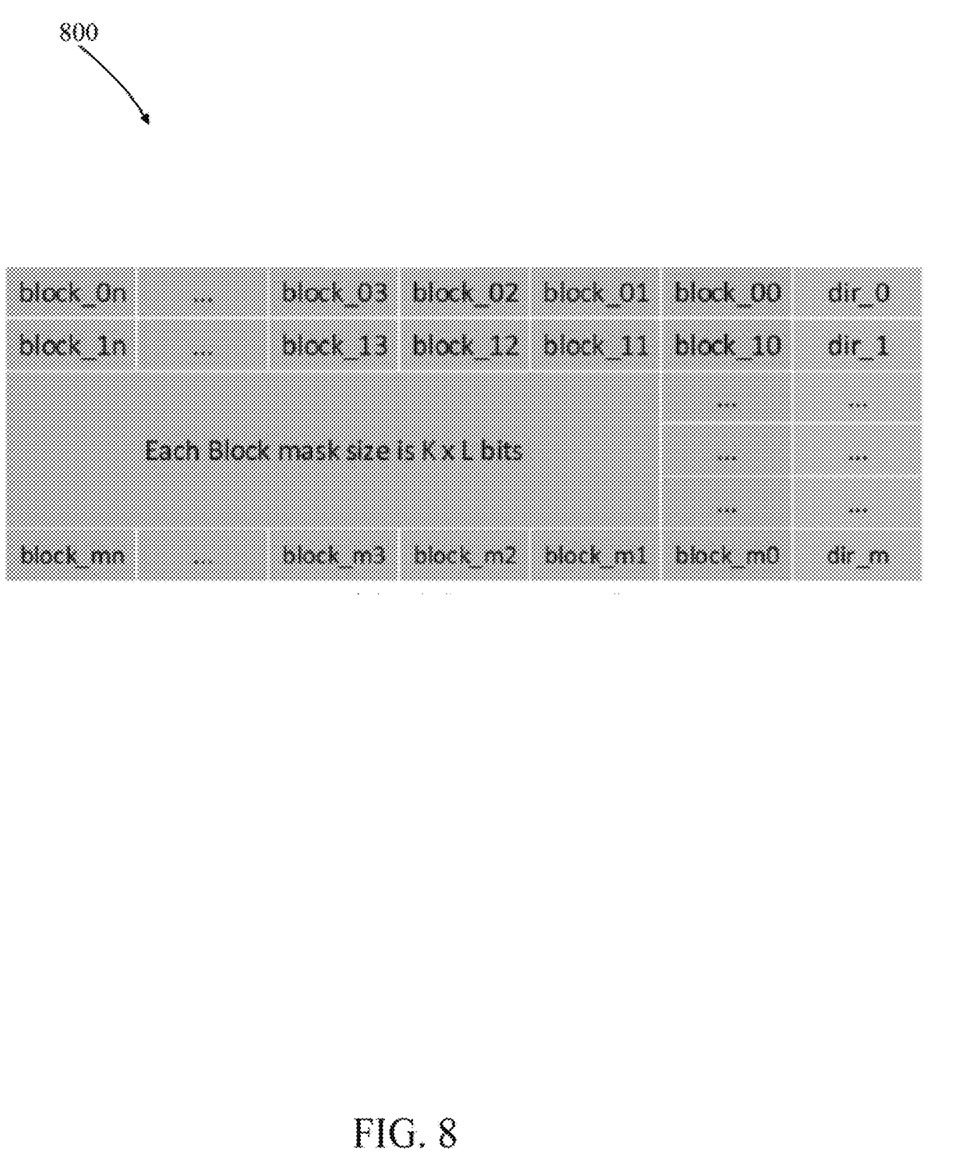
FIG. 8 is a depiction of a convolutional neural network having a block binary mask in accordance with one embodiment of the disclosure.

The block size is identified by memory array partitions. An example block size is 1×8×16. The encoding of sparsity may be provided through a mask M, in which 0 means removed element, while 1 represents left elements. The mask layout in the hardware memory is shown in FIG. 8.

Figure 9:
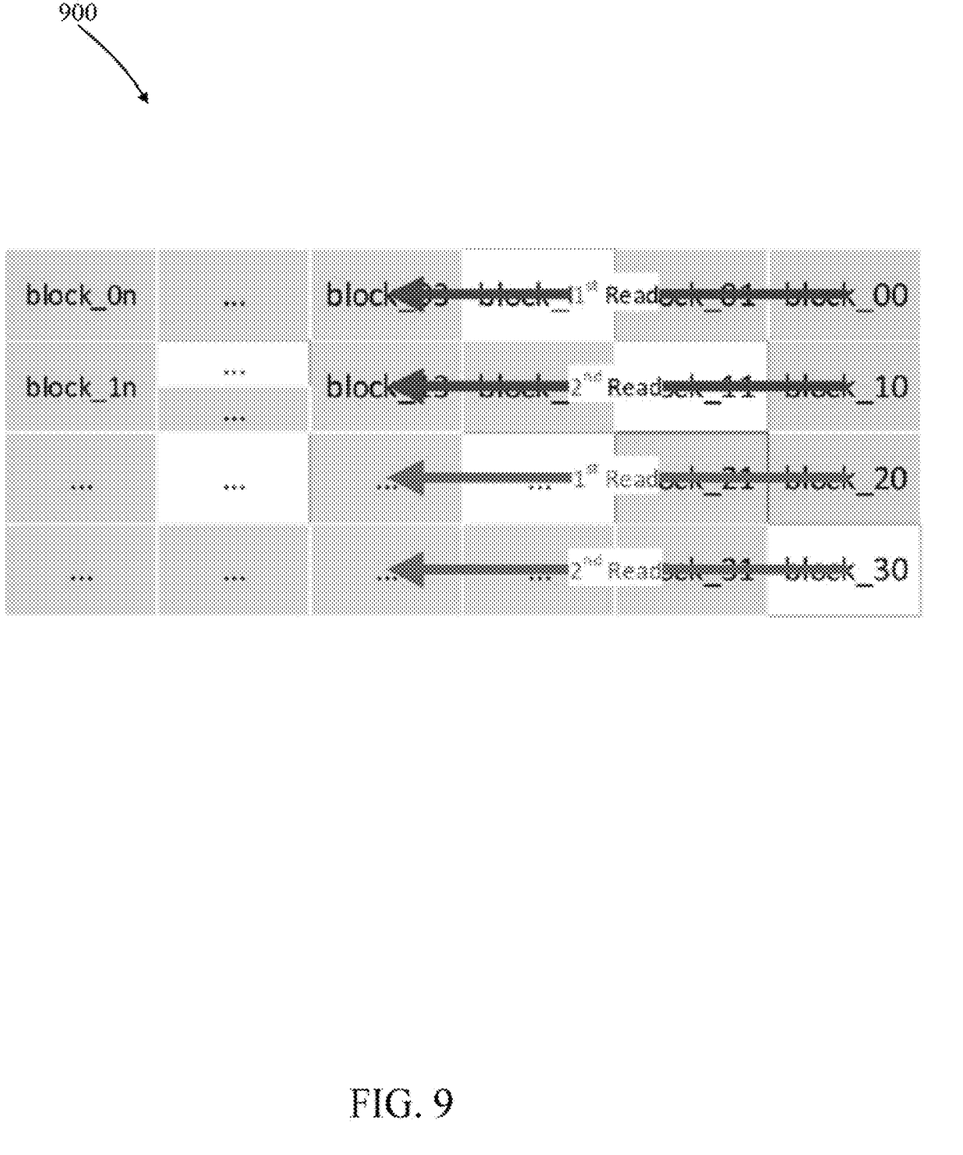
FIG. 9 is a depiction of weight blocks in accordance with one embodiment of the disclosure.

FIG. 9 illustrates the weight block layout in the memory, where white blocks are pruned ones, indicated by 0 in the mask. The group sparsity not only reduces filter size, but also significantly saves computations, since the whole cycle corresponding to the removed block may be skipped.

Rounding the Pruned Channel Number:

Hardware has a fixed number of mac-arrays, which may simultaneously process a certain number of channels, such as N. It is possible that the last cycle is partially occupied, where the remaining channels are less than N, thus reducing hardware utilization. Thus, it is preferable to have pruned channel number to be an integer multiple of N. The rounding of channel number may be performed during the training process.

Figure 10:
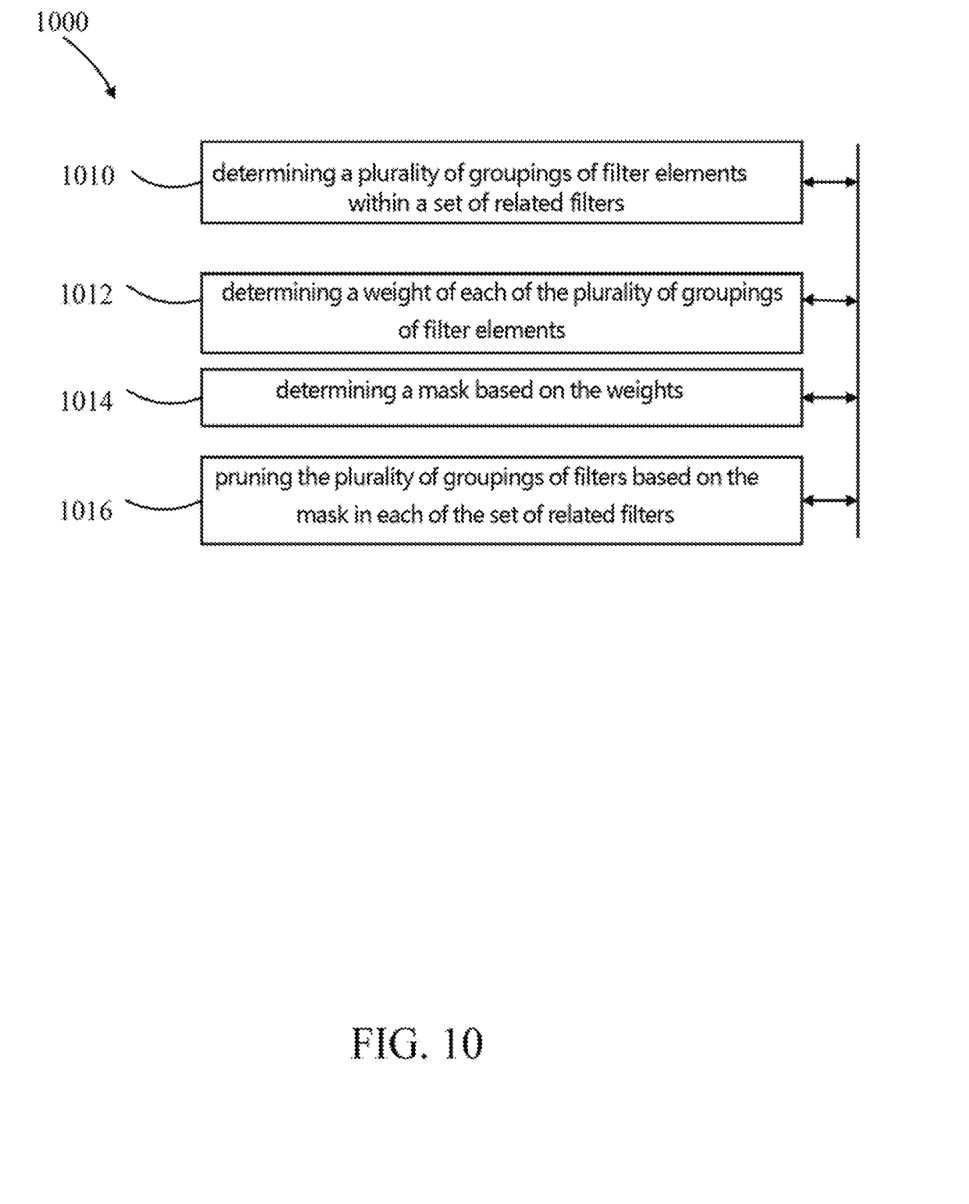
FIG. 10 is a depiction of a third method of pruning a convolutional neural network in accordance with one embodiment of the disclosure.

FIG. 10 depicts a third method of pruning a convolutional neural network, comprising determining 1010 a plurality of groupings of filter elements within a set of related filters, determining 1012 a weight of each of the plurality of groupings of filter elements, determining 1014 a mask based on the weights and pruning 1016 the plurality of groupings of filters based on the mask in each of the set of related filters.

Figure 11:
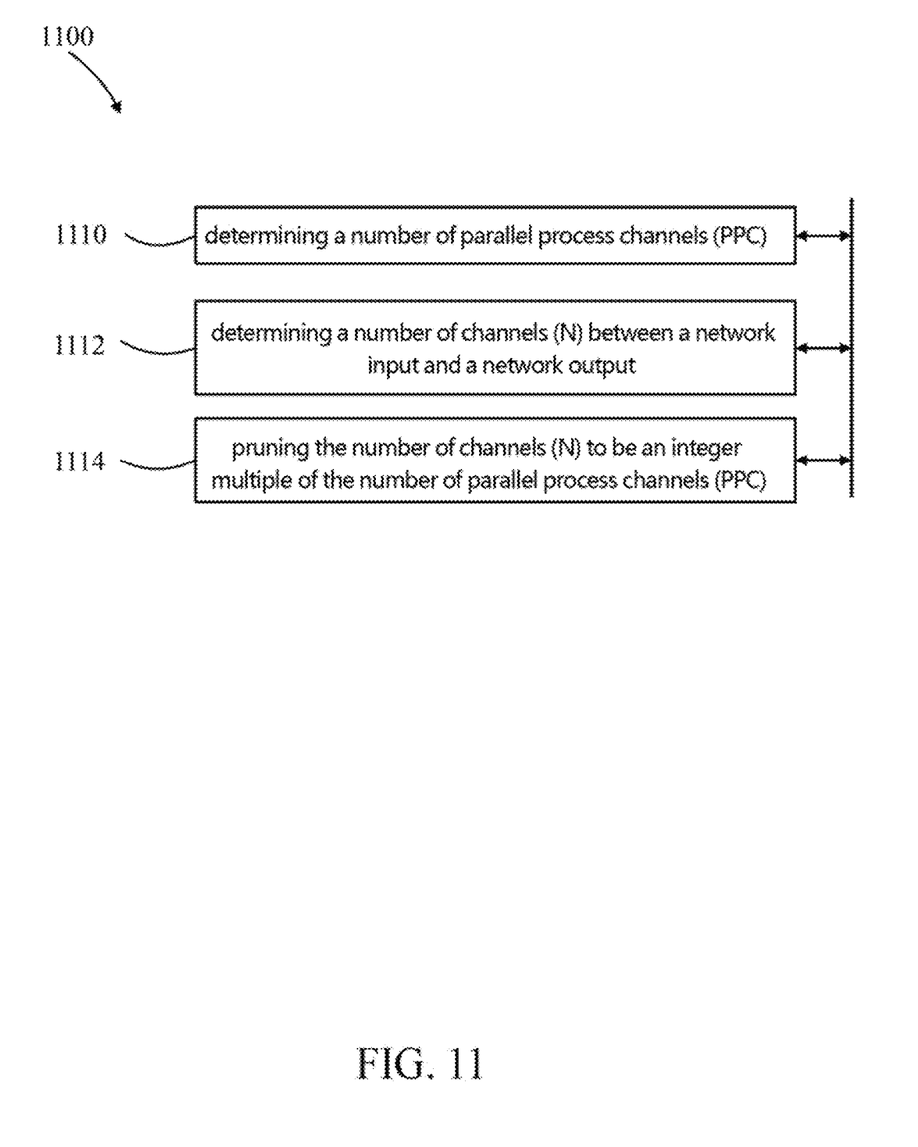
FIG. 11 is a depiction of a fourth method of pruning a convolutional neural network in accordance with one embodiment of the disclosure.

FIG. 11 depicts a fourth method of pruning a convolutional neural network, comprising determining 1110 a number of parallel process channels (PPC), determining 1112 a number of channels (N) between a network input and a network output and pruning 1114 the number of channels (N) to be an integer multiple of the number of parallel process channels (PPC).

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A computer implemented method for pruning a convolutional neural network during training for image recognition, the method comprising:
   storing the convolutional neural network in a memory device, wherein the convolutional neural network is used for recognizing an object in an image;
   determining, by a processor, a number of channels (N) between an input and an output of a respective residual block of the convolutional neural network, wherein a respective channel corresponds to a filter in the convolutional neural network, wherein at least one channel is a color filter which represents intensity of a single color in the image, and wherein the filter is stored as a matrix in the memory device;
   constructing at least one lookup table, wherein the lookup table indicates whether a channel is needed for a path between the input and output of the residual block of the convolutional neural network;
   storing the at least one lookup table in the memory device; and
   pruning filters in the convolutional neural network to create a shortcut between the input and the output based on the at least one lookup table; thereby facilitating reduction of size of the convolutional neural network and corresponding reduction of required storage space and computation cost associated with deployment of the convolutional neural network.

2. The method of pruning the convolutional neural network of claim 1 further comprising:
merging the channels between the input and the output;
categorizing N channel data flows; and
pruning filters by categorized N channel data flows.

3. The method of pruning the convolutional neural network of claim 2, wherein the categorization of N channel data flows is one of "only use by res," "add to res," and "bypass;" and wherein if the channel data flow is categorized as "only use by res," the method further comprises removing the channel data flow after calculation based on the N lookup tables.

4. The method of pruning the convolutional neural network of claim 1 further comprising:
determining a plurality of groupings of filter elements within a set of related filters;
determining a weight of each of the plurality of groupings of filter elements;
determining a mask based on the weight; and
pruning the plurality of groupings of filter elements based on the mask in each of the set of related filters.

5. The method of pruning the convolutional neural network of claim 1 further comprising:
determining a number of parallel process channels (PPC);
determining the number of channels (N) between the input and the output; and
pruning the number of channels (N) to be an integer multiple of the number of parallel process channels (PPC).

6. The method of pruning the convolutional neural network of claim 5 wherein the determining of the number of parallel process channels (PPC) is based on a hardware specific number of mac arrays which may be processed in parallel.

7. The method of pruning the convolutional neural network of claim 6 wherein the pruning of the number of channels is performed during a training process.

8. A computer implemented method for pruning a convolutional neural network during training for image recognition, the method comprising:
storing the convolutional neural network in a memory device, wherein the convolutional neural network is used for recognizing an object in an image;
determining, by a processor, a number of channels (N) between an input and an output of a respective residual block of the convolutional neural network, wherein a respective channel corresponds to a filter in the convolutional neural network, wherein at least one channel is a color filter which represents intensity of a single color in the image, and wherein the filter is stored as a matrix in the memory device;
constructing N lookup tables, each lookup table matched to a respective channel;
storing the N lookup tables in the memory device;
merging the channels between the input and the output;
categorizing N channel data flows; and
pruning filters by categorized N channel data flows; thereby facilitating reduction of size of the convolutional neural network and corresponding reduction of required storage space and computation cost associated with deployment of the convolutional neural network.

9. The method of pruning the convolutional neural network of claim 8, wherein the categorization of the N channel data flows is one of "only use by res," "add to res" and "bypass;" and if the channel data flow is categorized as "only use by res," the method further comprises removing the channel data flow after calculation based on the N lookup tables.

10. The method of pruning the convolutional neural network of claim 8 further comprising pruning filters in the convolutional neural network to create a shortcut between the input and the output based on the N lookup tables.

11. The method of pruning the convolutional neural network of claim 10 further comprising:
determining a plurality of groupings of filter elements within a set of related filters;
determining a weight of each of the plurality of groupings of filter elements;
determining a mask based on the weight; and
pruning the plurality of groupings of filter elements based on the mask in each of the set of related filters.

12. The method of pruning the convolutional neural network of claim 11 further comprising:
determining a number of parallel process channels (PPC); and
pruning the number of channels (N) to be an integer multiple of the number of parallel process channels (PPC).

13. A computer implemented method for pruning a convolutional neural network during training for image recognition, the method comprising:
storing the convolutional neural network in a memory device, wherein the convolutional neural network is used for recognizing an object in an image;
determining a plurality of groupings of filter elements within a set of related filters, wherein at least one filter is a color filter which represents intensity of a single color in the image, and wherein the filter is stored as a matrix in the memory device;
determining a weight of each of the plurality of groupings of filter elements;
determining a mask based on the weight; and
pruning the plurality of groupings of filter elements based on the mask in each of the set of related filters;
determining a number of channels (N) between an input and an output of a respective residual block of the convolutional neural network, wherein a respective channel corresponds to a filter in the convolutional neural network, wherein at least one channel is a color filter which represents intensity of a single color in the image, and wherein the filter is stored as a matrix in the memory device;
constructing N lookup tables, each lookup table matched to a respective channel, and wherein a respective lookup table indicates whether a channel is needed for a path between the input and output of the residual block of the convolutional neural network;
storing the lookup tables in the memory device; and
pruning filters in the convolutional neural network to create a shortcut between the input and the output based on the N lookup tables; thereby facilitating reduction of size of the convolutional neural network and corresponding reduction of required storage space and computation cost associated with deployment of the convolutional neural network.

14. The method of pruning the convolutional neural network of claim 13, further comprising:
merging the channels between the input and the output;
categorizing N channel data flows; and
pruning filters by categorized N channel data flows.

15. A computer implemented method for pruning a convolutional neural network during training for image recognition, the method comprising:
- storing the convolutional neural network in a memory device, wherein the convolutional neural network is used for recognizing an object in an image;
- determining, by a processor, a number of parallel process channels (PPC);
- determining a number of channels (N) between an input and an output of the residential block of the convolutional neural network wherein a respective channel corresponds to a filter in the convolutional neural network, wherein at least one channel is a color filter which represents intensity of a single color in the image, and wherein the filter is stored as a matrix in the memory device; and
- pruning the number of channels (N) to be an integer multiple of the number of parallel process channels (PPC);
- wherein the determining of the number of parallel process elements (PPC) is based on a hardware specific number of parallel process channels (PPC) is based on hardware specific number of mac arrays which may be processed in parallel, thereby facilitating reduction of size of the convolutional neural network and corresponding reduction of required storage space and computation cost associated with deployment of the convolutional neural network.

16. The method of pruning the convolutional neural network of claim 15 further comprising:
- determining a plurality of groupings of filter elements within a set of related filters;
- determining a weight of each of the plurality of groups o filter elements;
- determining a mask based on the weight; and
- pruning the plurality of groupings of filter elements based on the mask in each of the set of related filters.

17. The method of pruning the convolutional neural network of claim 16 further comprising:
- constructing N lookup tables, each lookup table matched to a respective channel; and
- pruning filters in the convolutional neural network to create a shortcut between the network input and the network output based on the N lookup tables.

* * * * *